(12) United States Patent
Slaybers

(10) Patent No.: US 8,055,718 B2
(45) Date of Patent: Nov. 8, 2011

(54) MANAGEMENT OF CARBON COPY AND REPLY TO ALL FUNCTIONS OF AN EMAIL

(75) Inventor: Robert J. Slaybers, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 11/673,610

(22) Filed: Feb. 12, 2007

(65) Prior Publication Data

US 2008/0195710 A1    Aug. 14, 2008

(51) Int. Cl.
    *G06F 15/16* (2006.01)
(52) U.S. Cl. ...................................... 709/206
(58) Field of Classification Search ........... 709/205–207
    See application file for complete search history.

(56) References Cited

U.S. PATENT DOCUMENTS

| | | | |
|---|---|---|---|
| 5,872,925 A * | 2/1999 | Han ............................. | 709/206 |
| 5,878,230 A | 3/1999 | Weber et al. | |
| 6,643,688 B1 | 11/2003 | Fuisz | |
| 6,789,107 B1 | 9/2004 | Bates et al. | |
| 2003/0033372 A1 | 2/2003 | Shimada | |
| 2003/0233410 A1 | 12/2003 | Gusler et al. | |
| 2004/0006599 A1 | 1/2004 | Bates et al. | |
| 2004/0078488 A1 | 4/2004 | Patrick | |
| 2005/0076090 A1 | 4/2005 | Thuerk | |
| 2005/0091318 A1* | 4/2005 | Keohane et al. ............. | 709/206 |
| 2005/0102368 A1 | 5/2005 | Forman et al. | |
| 2005/0177621 A1* | 8/2005 | Moody et al. ................ | 709/206 |
| 2005/0198144 A1 | 9/2005 | Kraenzel et al. | |
| 2005/0198158 A1 | 9/2005 | Fabre et al. | |
| 2006/0277262 A1 | 12/2006 | Boss et al. | |
| 2006/0277263 A1 | 12/2006 | Daniels et al. | |

OTHER PUBLICATIONS

University of Washington, "Pine User's Guide", Jan. 29, 1998, retrieved from http://www.washington.edu/pine/user-guide/ on Jul. 14, 2009.*
Resnick, "Internet Message Format", Apr. 2001, retrieved from http://www.ieft.org/rfc/rfc2822.txt on Jul. 14, 2009.*
Notification of Transmittal of the International Search Report and the Written Opinion of the International Searching Authority or the Declaration.

(Continued)

*Primary Examiner* — Joon H Hwang
*Assistant Examiner* — Thomas Lee, IV
(74) *Attorney, Agent, or Firm* — Yee & Associates, P.C.; Arthur J. Samodovitz

(57) ABSTRACT

Management of e-mail. A user at the originating workstation enters a first e-mail address into a primary address field, a second e-mail address into a secondary address field, a third e-mail address into a tertiary address field and text into the text field of an e-mail form to form an original e-mail, and requests to send the original e-mail including the first, second and third e-mail addresses to the first, second, and third e-mail addresses. A first recipient having the first e-mail address receives the original e-mail including the first, second and third e-mail addresses and the text, selects a command option to reply to all addressees in the primary address field and the secondary address field. In response, the reply e-mail is sent to a fourth e-mail address corresponding to said user and the second e-mail address but not the third e-mail address.

14 Claims, 5 Drawing Sheets

OTHER PUBLICATIONS

Resnick P. et al: "Internet Message Format; draft-resnick-2822upd—00.txt" IETF Standard-Working-Draft, Internet Engineering Task Force, IETF, CH, Jun. 18, 2006, XP015044973: ISSN: 0000-0004; Chapter 3.6.

University of Washington, "Pine User's Guide", Jan. 29, 1998, 11 pages.

P. Resnick, "Internet Message Format", Request for Comments: 2822, QUALCOMM Inc., Apr. 2001.

* cited by examiner

```
Andy@aol.com              To: Betty@aol.com
06/07/2006  02:38 PM      cc: Cathy@aol.com
                          bcc: David@cs.com
                          co: Edwin@stny.rr.com
                          Subject: The study
   Please conduct the study.
```
— 61

FIG. 2(A)

```
Andy@aol.com              To: Betty@aol.com
06/07/2006  02:38 PM      cc: Cathy@aol.com
                          bcc:
                          co: Edwin@stny.rr.com
                          Subject: The study
   Please conduct the study.
```
— 61'

FIG. 2(B)

```
Andy@aol.com              To: Betty@aol.com
06/07/2006  02:38 PM      cc: Cathy@aol.com
                          bcc: David@cs.com
                          co: Edwin@stny.rr.com
                          Subject: The study
   Please conduct the study.
```
— 61"

FIG. 2(C)

Betty@aol.com
06/07/2006 04:00 PM

To: Andy@aol.com
cc: Cathy@aol.com
bcc:
co:
Subject: The study

Yes, I will conduct the study.

FIG. 4

MANAGEMENT OF CARBON COPY AND REPLY TO ALL FUNCTIONS OF AN EMAIL

FIELD OF THE INVENTION

The present invention relates generally to computer systems, and more specifically to management of e-mail.

BACKGROUND OF THE INVENTION

Electronic mail or "e-mail" is well known today. Most computers and portable computing devices can send e-mail through a public Internet or a private intranet. Most operating systems such as Windows™ operating system, Linux™ operating system, Unix™ operating system, and Apple™ Mac operating system support an e-mail function through built in e-mail client programs or third party e-mail applications. Lotus Notes™ e-mail systems and Microsoft Outlook/Exchange™ e-mail systems are examples.

Typically, there is an e-mail client program that executes on each client workstation and an e-mail server program that executes on the e-mail server. Typically, a person creates an e-mail by invoking the e-mail client program to display an e-mail form or template, entering one or more recipient e-mail addresses in a "to" field, and entering a message into a text field. Generally, a recipient listed in the "to:" field is expected to take careful notice of the e-mail and respond, if a response is warranted. The person creating the e-mail may also enter one or more e-mail addresses in a "carbon copy" or "cc" field and one or more e-mail addresses in a "blind carbon copy" or "bcc" field. The addressees in the "cc" field will receive a copy of the note, generally for information or status update purposes, but they are not typically expected to respond to the note. The addressees in the "bcc" field will receive a copy of the note, generally for information or status update purposes, but they are not typically expected to respond to the note. The addressees listed in the "bcc:" field receive the e-mail discretely without the knowledge of the addressees in the "to:" and "cc:" fields.

The addressees in the "to" field and "cc" field will see the addresses in the "to" field and "cc" field, but not the addresses in the "bcc" field. The addressees in the "bcc" field will see the addresses in the "to" field, "cc" field and "bcc" field.

After entering the addressees in one or more fields, the person enters the text of the e-mail in the text field. The person can also attach files (i.e. text, video, audio, etc.) to the e-mail to be sent with the e-mail to the addressees. Finally, the person selects a "send" command to send the e-mail (and attachments, if any) to all the addressees in all of the "to", "cc" and "bcc" fields. In response, the e-mail client program sends the e-mail to an e-mail server. In response, the e-mail server queries a domain name server to determine the IP addresses of e-mail server(s) or ISP(s) of all of the addressees. After determining the IP addresses of the e-mail server(s) or ISP(s) of all the addressees, the e-mail server of the originator of the e-mail sends the e-mail to the e-mail server(s) or ISP(s) of the addressees. Subsequently, the addressees log-on to their e-mail server(s) or ISP(s) and request, open and read the original e-mail. Each addressee/recipient of the original e-mail can also respond to the e-mail by forwarding it to others specified by the recipient, replying to the sender or replying to "all" addressees listed in the "to" and "cc" address fields of the original e-mail.

To forward the original e-mail received from another person, the recipient selects a "forward" command, and after an e-mail response form is displayed, enters one or more e-mail addresses in address fields of the response form, and optionally add an e-mail to the original e-mail which is forwarded. When forwarding an e-mail, with or without adding an e-mail to the e-mail which is forwarded, the person forwarding the e-mail must specify the addressees for the "to" field, and optionally the "cc" and "bcc" fields. A person can reply to the sender of an e-mail by selecting a "reply" command. When the "reply" (to sender) command is selected, the e-mail system automatically enters the e-mail address of the sender of the original e-mail into the "to" field of the reply e-mail. Consequently, when the recipient of the original e-mail sends his or her reply e-mail, the reply e-mail will be sent back to the person who sent the original e-mail. A person can also select a "reply to all" command for an original e-mail. By selecting "reply to all" command, the e-mail client program will automatically enter (1) the e-mail address of the sender of the original e-mail into the "to" field of the reply e-mail, and (2) the e-mail addresses, if any, in the "cc" field of the original e-mail (and the e-mail address in the "to" field of the original e-mail, if this addressee is not the replier) into the "cc" field of the reply e-mail. After the recipient of the original e-mail selects the "send" option, the e-mail client program will notify the e-mail server program to send the e-mail to all addressees listed in the reply e-mail. In response, the e-mail server program will send the reply to all addressees in the original e-mail, i.e. the addressees in the "to" field, "cc" field and "bcc" field.

If the original e-mail includes an e-mail address in the "bcc" field, and the "bcc" addressee selects "reply to all", then the e-mail client program will automatically enter (1) the e-mail address of the sender of the original e-mail into the "to" field of the reply e-mail, and (2) the e-mail addresses, if any, in the "cc" field of the original e-mail (and the e-mail address in the "to" field of the original e-mail, if this addressee is not the replier) into the "cc" field of the reply e-mail.

If the original e-mail includes an e-mail address in the "bcc" field, and a "to" or "cc" addressee selects "reply to all", then the e-mail client program will automatically enter (1) the e-mail address of the sender of the original e-mail into the "to" field of the reply e-mail, and (2) the e-mail addresses, if any, in the "cc" field of the original e-mail (and the e-mail address in the "to" field of the original e-mail, if this addressee is not the replier) into the "cc" field of the reply e-mail. Note that this "reply to all" e-mail will not be sent to the e-mail address in the "bcc" field of the original e-mail.

As illustrated above, the "reply to all" command leads to proliferation of e-mail when the original e-mail identifies multiple addressees. In such a case, the reply will be sent to multiple addressees and this may not be needed. Proliferation of e-mail burdens the network and e-mail servers, often times unnecessarily.

U.S. Pat. No. 5,878,230 discloses that a user specifies/manages override of automatic reply addressing, and manages auto copy list address ("cc" and/or "blind cc"). The user may specify individual explicit addresses, nicknames later resolved to addresses, or distribution lists. Distribution lists may include, for example, all managers at a particular level in a business organization or members of a particular task force to which the message pertains. Then, the user is provided with the opportunity to specify some automatic copy addresses. The originator is provided with the opportunity to select a previously prepared list of recipients in the third party addressing mode, which will depend on actions of the recipient of the message.

U.S. Pat. No. 5,872,925 discloses an option which enables blocking of a "reply to all" option in an e-mail system.

US Published Patent application 2004/0078488 discloses a system which permits a recipient of a multiparty e-mail message to select recipients of a reply message by parsing the received e-mail message for e-mail addresses and forming a list from which the user can select reply recipients.

US Published Patent Application 2003/0233410 discloses a system and method for providing control by an author over the dissemination of information contained in a blind carbon copy electronic message. The author may specify whether or not a BCC recipient may reply to the author, reply to any of the other message recipients, forward the message, copy, save or print the message.

An object of the present invention is to better control selection of recipients of a reply to an e-mail.

SUMMARY OF THE INVENTION

The present invention resides in a computer system, method and program product for managing an e-mail. An originating workstation provides an e-mail form with a primary address field, a secondary address field, a tertiary address field and a text field. A user at the originating workstation enters a first e-mail address into the primary address field, a second e-mail address into the secondary address field, a third e-mail address into the tertiary address field and text into the text field to form an original e-mail, and requests to send the original e-mail to the first, second, and third e-mail addresses. A first recipient having the first e-mail address receives the original e-mail including the first, second and third e-mail addresses and the text, selects a command option to reply to all addressees in the primary address field and the secondary address field. In response, the first recipient is presented with an e-mail form to reply to the original e-mail. The reply e-mail form includes a primary address field, a secondary address field, a tertiary address field and a text field. A fourth e-mail address of the user is automatically entered into the primary address field of the reply e-mail form. The first and second e-mail addresses are automatically entered into the secondary address field of the reply e-mail form. The third e-mail address is not automatically entered into any address field of the reply e-mail form. The first recipient enters text into the reply e-mail form to form a reply e-mail and selects to send the reply e-mail. In response, the reply e-mail is sent to the fourth e-mail address, the first e-mail address and the second e-mail address but not the third e-mail address.

BRIEF DESCRIPTION OF THE FIGURES

FIGS. 2(A), 2(B) and 2(C) illustrate e-mails, including address fields, according to the present invention.

FIG. 4 illustrates an e-mail, including address fields, which is responsive to an e-mail of FIGS. 2(A), 2(B) or 2(C).

DETAILED DESCRIPTION OF THE PREFERRED EMBODIMENTS

Figure 1:
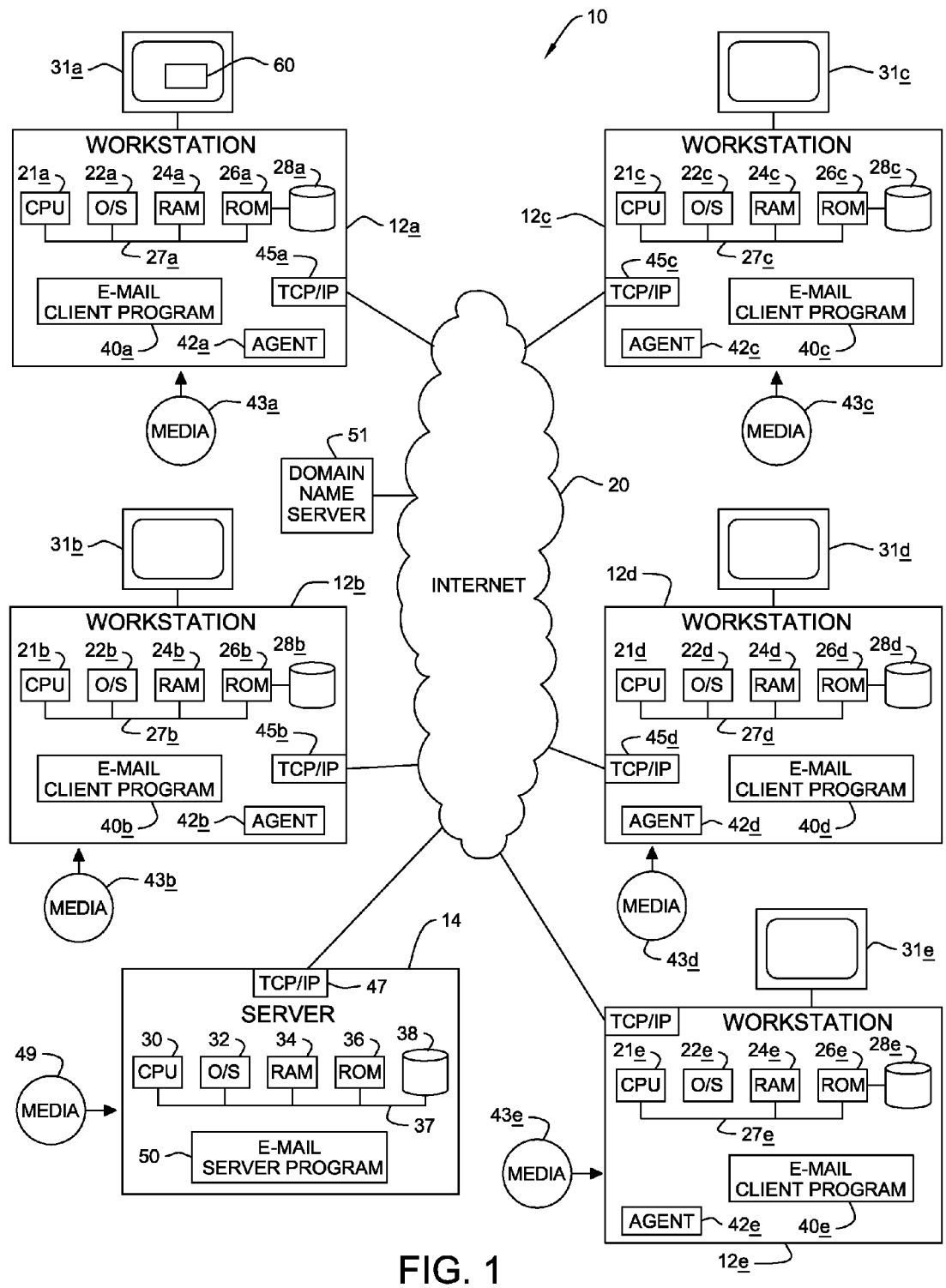
FIG. 1 is a block diagram of a distributed computer system, including client workstations with an e-mail client program and a mail server with an e-mail server program, according to the present invention.

The present invention will now be described in detail with reference to the figures. FIG. 1 illustrates a distributed computer system generally designated 10. System 10 comprises client workstations 12a,b,c,d,e and an e-mail server 14 (such as provided by an Internet Service Provider) interconnected to each other via a network 20 such as the Internet. Client workstations 12a,b,c,d,e comprises respective known CPUs 21a,b,c,d,e, operating systems 22a,b,c,d,e, RAM 24a,b,c,d,e and ROM 26a,b,c,d,e interconnected via busses 27a,b,c,d,e and storage 28a,b,c,d,e and display monitors 31a,b,c,d,e. Server 14 comprises a known CPU 30, operating system 32, RAM 34 and ROM 36 interconnected via a bus 38, and storage 38. Client workstations 12a,b,c,d,e comprise respective e-mail client programs 40a,b,c,d,e. When invoked by a user, the respective client program 40a,b,c,d,e at the user's workstation 12a,b,c,d,e generates and displays an e-mail form or e-mail template 60.

FIG. 2(A) further illustrates e-mail form 60. According to the prior art, e-mail form 60 includes "to", "cc" and "bcc" address fields and a text field, and e-mail client programs 40a,b,c,d,e include known functions to enable respective users 15a,b,c,d,e to create an e-mail, address an e-mail to recipients via "to", "cc" and "bcc" address fields and send the resultant e-mail to e-mail server 14. According to the present invention, the e-mail form 60 also includes a "copy once" or "co" address field, and e-mail client programs 40a,b,c,d,e include a new function to enable the respective user to enter one or more e-mail addresses in the "copy once" or "co" address field, and then process the e-mail address in the "co" field. All recipients of e-mail 61 (which comprises e-mail 60 together with its addresses and text), will see the one or more addresses in the "co" address field. This is unlike one or more addresses in a "bcc" address field of an original e-mail where the other recipients of the original e-mail will not see the one or more addresses in the "bcc" address field of the original e-mail. FIG. 2(B) is a diagram of a corresponding e-mail 61' as seen by the "to", "cc" and "co" addressees. The e-mail 61' seen by the "to", "cc" and "co" addressees is the same as original e-mail 61 except e-mail 61' omits the "bcc" addressee which appears in e-mail 61. FIG. 2(C) is a diagram of a corresponding e-mail 61" as seen by the "bcc" addressee. E-mail 61" is the same as original e-mail 61.

Figure 3A:
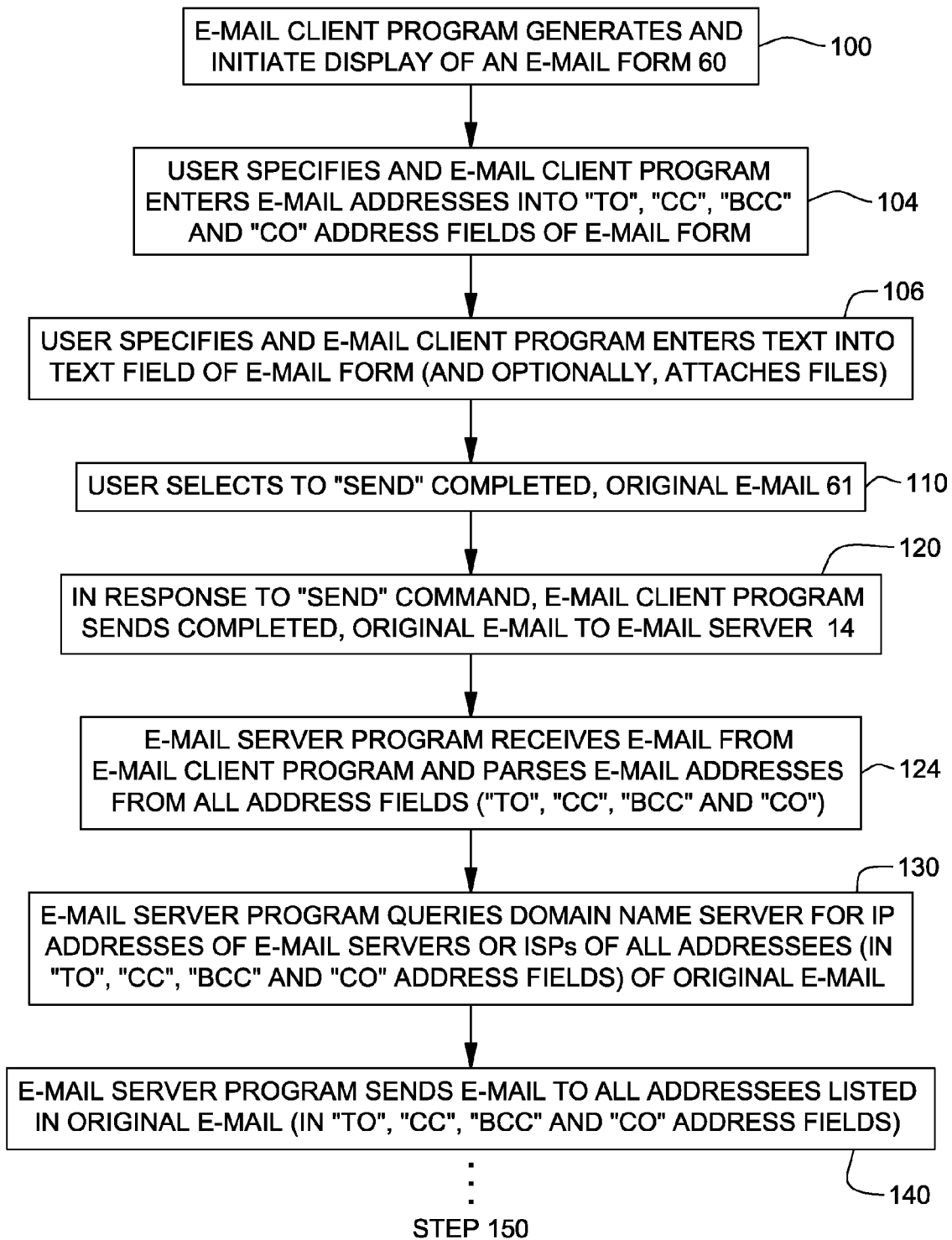
FIGS. 3(A) and 3(B) form a flow chart illustrating function and operation of the e-mail client programs and e-mail server program of FIG. 1.
Figure 3B:
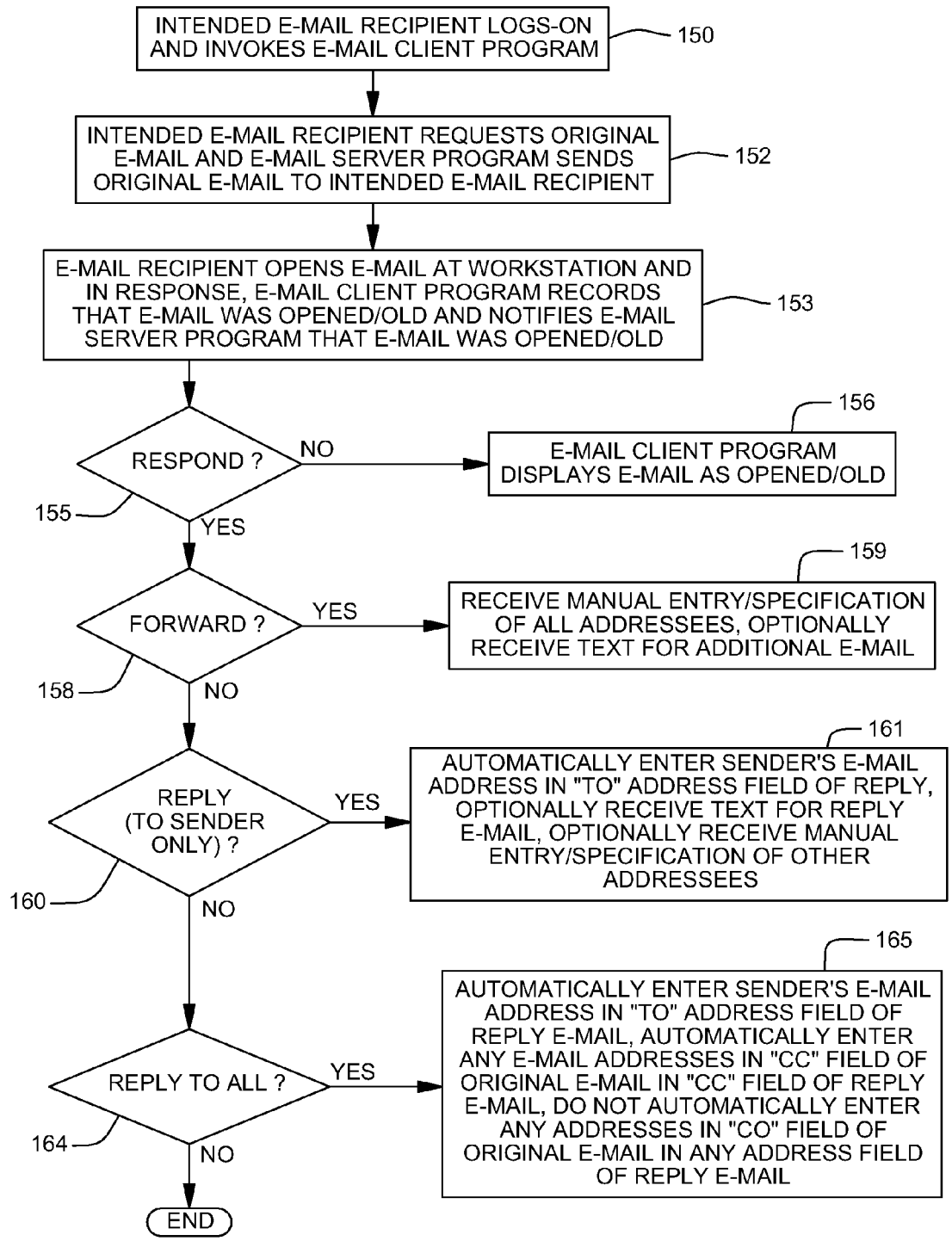

As illustrated in FIGS. 3(A) and 3(B), e-mail client programs 40a,b,c,d,e include known and new functions to (a) generate and initiate display of an e-mail form or template including "to", "cc", "bcc" and "co" address fields and a text field (step 100), (b) enter addressees specified by the user into the "to", "cc", "bcc" and "co" address fields (step 104), (c) enter text specified by the user into the text field (step 106) (and optionally attach files specified by the user to the e-mail), and (d) send the e-mail (with the text in the text field to the addressees listed in the "to", "cc", "bcc" and "co" fields) to e-mail server 14 upon request by the user to send the e-mail to the addressees (step 110).

FIG. 2(A) illustrates a completed e-mail 61 generated by user 15a (with e-mail address Andy@aol.com) from form 60 at workstation 12a, and specifies (i) user 15b (with e-mail address Betty@aol.com) (for example, at workstation 12b) in the "to" (or primary) field, (ii) user 15c (with e-mail address Cathy@aol.com) (for example, at workstation 12c) in the "cc" (or secondary) field, (iii) user 15d (with e-mail address David@cs.com) (for example, at workstation 12d) in the "bcc" field, and (iv) user 15e (with e-mail address Edwin@stny.rr.com) (for example, at workstation 12e) in the "copy once" or "co" field. In this example, Betty@aol.com, Cathy@aol.com, David@cs.com and Edwin@stny.rr.com will all see the addressee Edwin@aol.com in the "co" address field of the original e-mail that they receive from Andy@aol.com. FIG. 2(B) illustrates the corresponding e-mail 61' as seen by Betty@aol.com, Cathy@aol.com, and Edwin@stny.rr.com. E-mail 61' omits the "bcc" addressee, David@cs.com. FIG. 2(C) illustrates the corresponding e-mail 61" as seen by David@cs.com. E-mail 61" is the same as the original e-mail 61 and includes the addressee, David@cs.com.

E-mail server 14 serves workstation 12*a* (and may also serve workstations 12*b*, 12*c*, 12*d*, and/or 12*e*) and includes an e-mail server program 50. After the author or originator of the original e-mail 61 selects the "send" command in step 110, the e-mail client program 40*a* sends the e-mail to e-mail server 14 (step 120) where e-mail server program 50 parses the addressees from each of the "to", "cc", "bcc" and "co" field (step 124). Program 50 includes a known function to query a Domain Name Server 51 to determine the IP address of each addressee listed in the "to", "cc" and "bcc" address fields of the original e-mail 61 (step 130). According to the present invention, this function in program 50 also queries Domain Name Server 51 to determine the IP address of each addressee listed in the "copy once" or "co" field of original e-mail 61 (step 130). After receiving the identification of IP address of each addressee listed in the "to", "cc", "bcc" and "co" field from the Domain Name Server 51, e-mail server program 50 sends the original e-mail 61 to the e-mail server or ISP of each of these IP addresses (step 140). In the illustrated example, e-mail server program 50 sends the e-mail to the e-mail servers or ISPs for users 15*d,c,d,e* because users 15*d,c,d,e* are all listed in one of the address fields of the original e-mail 61.

Some time later, users 15*d,c,d,e* log-on to their respective ISPs and their ISPs' e-mail servers from respective workstations 12*b,c,d,e* (although they could have logged on to their ISPs from other workstations if desired) (step 150), and fetch, open and read the original e-mail sent by user 15*a* (step 152). After the recipient opens the original e-mail, the e-mail client program records that the original e-mail has been opened (or is "old"), and so notifies the e-mail server program that the original e-mail has been opened (or is "old") (step 153). Each of the users/recipients 15*d,c,d,e* then has the option to (a) file away the e-mail (i.e. not forward it or reply to it) (decision 155, no branch and step 156), (b) forward the e-mail to one or more other addressees by selecting the "forward" option, entering addressees in one or more of the address fields and optionally creating another e-mail to accompany the forwarded e-mail (decision 155, yes branch, decision 158, yes branch and step 159), (c) reply to the e-mail by selecting the "reply" option and creating a reply e-mail (decision 158, no branch, decision 160, yes branch and step 161), or (d) "reply to 'all'" (except the "co" addressee(s) by selecting the "reply to all" option and creating a reply e-mail (decision 160, no branch, decision 164 yes branch and step 165).

These responses to original e-mail 61 are further described as follows. To simply file away the e-mail without forwarding it or replying to it in step 156, typically the recipient opens the e-mail and then takes no further action; the respective e-mail client program with then move the e-mail from a "new mail" status or list to an "opened mail" or "old mail" status or list. To forward the e-mail to one or more other addressees specified by the recipient in step 159, the recipient selects the "forward" option, enters the one or more e-mail addresses into the "to", "cc", "bcc" and/or "co" field, optionally enters text for an additional e-mail to accompany the forwarded original e-mail and then selects the "send" option. The recipient's e-mail client program then sends the forwarded e-mail and additional e-mail, if any, to the recipient's e-mail server for processing as described above, i.e. determination from a domain name server of the IP addresses of each addressee and then sending the forwarded e-mail and additional e-mail, if any, to these IP addresses. To "reply" to the e-mail in step 161, the recipient selects the "reply" option. In response, the recipient's e-mail client program automatically generates and displays a reply e-mail form with "to", "cc", "bcc" and "co" address fields and a text field, and automatically enters into the "to" field the e-mail address of the author/originator of the original e-mail 61. Next, the recipient enters text for the reply e-mail and selects the "send" command. In response, the recipient's e-mail client program sends the reply to the recipient's e-mail server for processing as described above, i.e. determination from a domain name server of the IP address of the e-mail address in the "to" field and then sending of the reply to this IP address. (The recipient can also enter other e-mail addresses, manually, into the "to", "cc", "bcc" and "co" address fields if desired. If so, the e-mail server will send the e-mail to these additional addressees as well.) To "reply to 'all'" to the e-mail in step 165, the recipient selects the new "reply to all" function. In response, the recipient's e-mail client program (a) automatically generates and displays a reply e-mail form with "to", "cc", "bcc" and "co" address fields and a text field, (b) automatically enters into the "to" field the e-mail address of the sender of the original e-mail 61 and (b) automatically enters into the "cc" field the e-mail address(es), if any, in the "cc" field of the original e-mail 61. However, the recipient's e-mail client program does not enter into any of the address fields of the reply e-mail, any of the e-mail addresses listed in the "co" field of the original e-mail 61. Thus, the reply will not be sent to any of the e-mail addresses listed in the "co" field of the original e-mail (unless such e-mail addresses were also listed in the "to" or "cc" field or the recipient manually entered such e-mail addresses in one of the address fields. Next, the recipient enters text for the reply e-mail.

FIG. 4 illustrates such a reply e-mail. Next, the recipient selects the "send" command for the response created in step 157, 159, 161 or 165 (step 180). In response, the recipient's e-mail client program sends the responsive e-mail to each recipient's e-mail server for processing as described above, i.e. determination from a domain name server of the IP addresses of the e-mail server or ISP for the e-mail address (es) in the "to" field and "cc" field, if any, (step 130), and then sending of the responsive e-mail (i.e. forward without additional e-mail, forward with additional e-mail or reply) to these IP addresses (step 140). Because the one or more addresses in the "co" field of the original e-mail are not listed in any of the address fields of the reply e-mail, selection of the new "reply to all" command does not cause the reply e-mail to be sent to the one or more addresses in the "co" field of the original e-mail 61. Thus, unnecessary proliferation of the e-mail is avoided, as specified by the originator of the e-mail. In other words, because the originator of e-mail 61 listed an e-mail address, such as Edwin@stny.rr.com, in the "co" field, if any recipient of the e-mail selects the "reply to all" or like command (such as reply to only addressees in the "to", "cc" and "bcc" address fields), the reply e-mail will not automatically be sent to the e-mail address in the "co" address field of the original e-mail.

E-mail client programs 40*a,b,c,d,e* can be loaded into respective workstations 12*a,b,c,d,e* via respective computer readable media 43*a,b,c,d,e* such as magnetic tape or disk, optical media, DVD, memory stick, semiconductor memory, etc.

E-mail server program 50 can be loaded into server 14 via computer readable media 49 such as magnetic tape or disk, optical media, DVD, memory stick, semiconductor memory, etc.

Based on the foregoing, a system, method and program product for managing replies to e-mail have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for managing an e-mail, the method comprising the steps of:

a computer for a first recipient having a first e-mail address receiving and presenting on a display to the first recipient an original e-mail including the first e-mail address visible in a primary address field, a second e-mail address visible in a secondary address field, a third e-mail address visible in a tertiary address field and text in a text field, the computer receiving from the first recipient a selection of a single command option to reply to all addressees in the primary address field and the secondary address field, and in response, the computer presenting on the display an e-mail form to reply to the original e-mail, the reply e-mail form including a primary address field, a secondary address field, a tertiary address field and a text field;

the computer automatically entering a fourth e-mail address of a user who originated the original e-mail into the primary address field of the reply e-mail form and automatically entering the first and second e-mail addresses into the secondary address field of the reply e-mail form, not automatically entering the third e-mail address into any address field of the reply e-mail form; and the computer receiving entry by the first recipient of text into the reply e-mail form to form a reply e-mail and the computer receiving a selection by the recipient to send the reply e-mail, and in response, the computer sending the reply e-mail to the fourth e-mail address, the first e-mail address and the second e-mail address but not the third e-mail address, wherein the primary address field of the original e-mail and the primary address field of the reply e-mail are "to" address fields, and the secondary address field of the original e-mail and the secondary address field of the reply e-mail are "cc" address fields, wherein the tertiary address field of the original e-mail is such that the original e-mail will be sent to e-mail addresses listed in the primary address field, the secondary address field and the tertiary address field, but selection of a single "reply to all" command option to the e-mail will not automatically address a reply e-mail to the e-mail address listed in the tertiary address field.

2. A method as set forth in claim 1 further comprising the steps of:

another computer of a second recipient having the second e-mail address receiving and displaying the original e-mail including the first, second and third e-mail addresses and the text, the other computer receiving from the second recipient selection of a single command option to reply to all addressees in the primary address field and the secondary address field, and in response, the other computer presenting the second recipient with a second e-mail form to reply to the original e-mail, the second reply e-mail form including a primary address field, a secondary address field, a tertiary address field and a text field; and the other computer automatically entering a fourth e-mail address of the user into the primary address field of the second reply e-mail form and automatically entering the first e-mail address into the secondary address field of the second reply e-mail form, the other computer not automatically entering the third e-mail address into any address field of the second reply e-mail form, the other computer receiving from the second recipient entry of text for the second reply e-mail form to form a second reply e-mail and a selection to send the second reply e-mail, and in response, the other computer sending the second reply e-mail to the fourth e-mail address and the first e-mail address but not the third e-mail address.

3. A method as set forth in claim 1 further comprising the steps of:

another computer of a third recipient having the third e-mail address receiving and displaying the original e-mail including the first, second and third e-mail addresses and the text, the other computer receiving from the third recipient selection of a single command option to reply to all addressees in the primary address field and the secondary address field, and in response, the other computer presenting the third recipient with a second e-mail form to reply to the original e-mail, the second reply e-mail form including a primary address field, a secondary address field, a tertiary address field and a text field;

the other computer automatically entering a fourth e-mail address of the user into the primary address field of the second reply e-mail form and automatically entering the first and second e-mail addresses into the secondary address field of the second reply e-mail form, the other computer not automatically entering the third e-mail address into the primary, secondary or tertiary address fields of the second reply e-mail form, the other computer receiving from the third recipient entry of text for the second reply e-mail form to form a second reply e-mail and a selection to send the second reply e-mail, and in response, the other computer sending the second reply e-mail to the fourth e-mail address, the first e-mail address and the second e-mail address but not the third e-mail address.

4. The method of claim 1, wherein the original e-mail presented on the display further comprises a blind-copy-copy (bcc:) field with no email address contained therein.

5. A computer program product for managing an e-mail, the computer program product comprising:

one or more computer readable, tangible storage devices;

first program instructions to receive and direct presentation on a display of an original e-mail including a first e-mail address visible in a primary address field, a second e-mail address visible in a secondary address field, a third e-mail address visible in a tertiary address field and text in a text field, to enable a first recipient having the first e-mail address to select a single command option to reply to all addressees in the primary address field and the secondary address field, and in response, present the first recipient with an e-mail form to reply to the original e-mail, the reply e-mail form including a primary address field, a secondary address field, a tertiary address field and a text field;

second program instructions to automatically enter a fourth e-mail address of the user into the primary address field of the reply e-mail form and automatically enter the first and second e-mail addresses into the secondary address field of the reply e-mail form, and not automatically enter the third e-mail address into any address field of the reply e-mail form; and third program, instructions to enable the first recipient to enter text into the reply e-mail form to form a reply e-mail and select to send the reply e-mail, and in response, send the reply e-mail to the fourth e-mail address, the first e-mail address and the second e-mail address but not the third e-mail address, wherein the primary address field of the original e-mail and the primary address field of the reply e-mail are "to" address fields, and the secondary address field of the original e-mail and the secondary address field of the reply e-mail are "cc" address fields, wherein the tertiary address field of the original e-mail is such that the original e-mail will be sent to e-mail addresses listed in the primary address field, the secondary address field and the tertiary address field, but selection of a single "reply to all" command option to the e-mail will not automatically address a reply e-mail to the e-mail address listed in the tertiary address field; and wherein the first, second and third program instructions are stored on the one or more computer readable, tangible storage devices.

6. A computer program product as set forth in claim 5 further comprising:

fourth program instructions to receive and direct presentation on a second display of another computer of a second recipient having the second e-mail address of the original e-mail including the first, second and third e-mail addresses and the text, to enable the second recipient to select a single command option to reply to all addressees in the primary address field and the secondary address field, and in response, present the second recipient with a second e-mail form to reply to the original e-mail, the second reply e-mail form including a primary address field, a secondary address field, a tertiary address field and a text field; and fifth program instructions to automatically enter a fourth e-mail address of the user into the primary address field of the second reply e-mail form and automatically enter the first e-mail address into the secondary address field of the second reply e-mail form, but not automatically enter the third e-mail address into any address field of the second reply e-mail form, enable the second recipient to enter text for the second reply e-mail form to form a second reply e-mail and select to send the second reply e-mail, and in response, send the second reply e-mail to the fourth e-mail address and the first e-mail address but not the third e-mail address; and wherein the fourth and fifth program instructions are stored on the computer readable, tangible storage device.

7. A computer program product as set forth in claim 5 further comprising:

fourth program instructions to receive and direct presentation on a second display of another computer of a second recipient having the second e-mail address of the original e-mail including the first, second and third e-mail addresses and the text, to enable the third recipient to select a single command option to reply to all addressees in the primary address field and the secondary address field, and in response, present the third recipient with a second e-mail form to reply to the original e-mail, the second reply e-mail form including a primary address field, a secondary address field, a tertiary address field and a text field; and fifth program instructions to automatically enter a fourth e-mail address of the user into the primary address field of the second reply e-mail form and automatically enter the first and second e-mail addresses into the secondary address field of the second reply e-mail form, but not automatically enter the third e-mail address into the primary, secondary or tertiary address fields of the second reply e-mail form, and enable the third recipient to enter text for the second reply e-mail form to form a second reply e-mail and select to send the second reply e-mail, and in response, send the second reply e-mail to the fourth e-mail address, the first e-mail address and the second e-mail address but not the third e-mail address; and wherein the fourth and fifth program instructions are stored on the one or more computer readable, tangible storage devices.

8. The computer program product of claim 5, wherein the original e-mail further comprises a blind-copy-copy (bcc:) field with no email address contained therein.

9. The computer program product of claim 5, further comprising:

third program instructions to provide at an originating workstation an e-mail form with the primary address field, the secondary address field, the tertiary address field and the text field;

fourth program instructions to enable a user at the originating workstation to enter the first e-mail address into the primary address field, the second e-mail address into said secondary address field, the third e-mail address into the tertiary address field and the text into the text field to form the original e-mail, and request to send the original e-mail to the first, second, and third e-mail addresses.

10. A system for managing an e-mail, the system comprising:

a data processor coupled to a computer-readable memory and operable for executing program instructions stored in a computer-readable, tangible storage device via the memory, the program instructions comprising:

first program instructions to receive and direct presentation on a display of a computer an original e-mail to a first recipient having a first e-mail address, the displayed original e-mail including the first e-mail address visible in a primary address field, a second e-mail address visible in a secondary address field, a third e-mail address visible in a tertiary address field and text in a text field to enable the first recipient to select a single command option to reply to all addressees in the primary address field and the secondary address field, and in response, to present the first recipient with an e-mail form to reply to the original e-mail, the reply e-mail form including a primary address field, a secondary address field, a tertiary address field and a text field, and to automatically enter a fourth e-mail address of the user into the primary address field of the reply e-mail form;

second program instructions to automatically enter the first and second e-mail addresses into the secondary address field of the reply e-mail form, and not automatically enter the third e-mail address into any address field of the reply e-mail form; and third program instructions to enable the first recipient to enter text into the reply e-mail form to form a reply e-mail and select to send the reply e-mail, and in response, send the reply e-mail to the fourth e-mail address, the first e-mail address and the second e-mail address but not the third e-mail address, wherein the primary address field of the original e-mail and the primary address field of the reply e-mail are "to" address fields, and the secondary address field of the original e-mail and the secondary address field of the reply e-mail are "cc" address fields, wherein the tertiary address field of the original e-mail is such that the original e-mail will be sent to e-mail addresses listed in the primary address field, the secondary address field and the tertiary address field, but selection of a single "reply to all" command option to the e-mail will not automatically address a reply e-mail to the e-mail address listed in the tertiary address field.

11. A computer system as set forth in claim 10 further comprising a second recipient workstation comprising a second data processor coupled to a second memory and operable for executing second memory instructions in the second memory, the second memory instructions comprising:

program instructions to receive and direct presentation on a second display of another computer of a second recipient having the second e-mail address of the original e-mail including the first, second and third e-mail addresses and the text, to enable the second recipient to select a single command option to reply to all addressees in the primary address field and the secondary address field, and in response, present the second recipient with a second e-mail form to reply to the original e-mail, the second reply e-mail form including a primary address field, a secondary address field, a tertiary address field and a text field; and program instructions to automatically enter a fourth e-mail address of the user into the primary address field of the second reply e-mail form and automatically enter the first e-mail address into the secondary address field of the second reply e-mail form, but not automatically enter the third e-mail address into any address field of the second reply e-mail form, and enable the second recipient to enter text for the second reply e-mail form to form a second reply e-mail and select to send the second reply e-mail, and in response, send the second reply e-mail to the fourth e-mail address and the first e-mail address but not the third e-mail address.

12. A computer system as set forth in claim 10 further comprising another recipient workstation including a third data processor coupled to a third memory and operable for executing third memory instructions in the third memory, the third memory instructions comprising:

program instructions to receive and direct presentation on a third display of another computer of a third recipient having the third e-mail address of the original e-mail including the first, second and third e-mail addresses and the text, to enable the third recipient to select a single command option to reply to all addressees in the primary address field and the secondary address field, and in response, to present the third recipient with a second e-mail form to reply to the original e-mail, the second reply e-mail form including a primary address field, a secondary address field, a tertiary address field and a text field;

program instructions to automatically enter a fourth e-mail address of the user into the primary address field of the second reply e-mail form and automatically enter the first and second email addresses into the secondary address field of the second reply e-mail form, but not automatically enter the third e-mail address into the primary, secondary or tertiary address fields of the second reply e-mail form; and program instructions to enable the third recipient to enter text for the second reply e-mail form to form a second reply e-mail and select to send the second reply e-mail, and in response, send the second reply e-mail to the fourth e-mail address, the first e-mail address and the second e-mail address but not the third e-mail address.

13. The system of claim 10, wherein the original e-mail further comprises a blind-copy-copy (bcc:) field with no email address contained therein.

14. The system of claim 10, further comprising an originating workstation including a fourth data processor coupled to a fourth memory and operable for executing fourth memory instructions in the fourth memory, the fourth memory instructions comprising:

program instructions to provide an e-mail form with the primary address field, the secondary address field, the tertiary address field and the text field, and enable the user to enter the first e-mail address into the primary address field, the second e-mail address into the secondary address field, the third e-mail address into the tertiary address field and the text into the text field to form the original e-mail, and request to send the original e-mail to the first, second, and third e-mail addresses.

* * * * *